B. C. BAILEY.
AUTOMOBILE TRANSMISSION MECHANISM.
APPLICATION FILED MAR. 24, 1917. RENEWED AUG. 5, 1918.
1,291,715.
Patented Jan. 21, 1919.
5 SHEETS—SHEET 2.
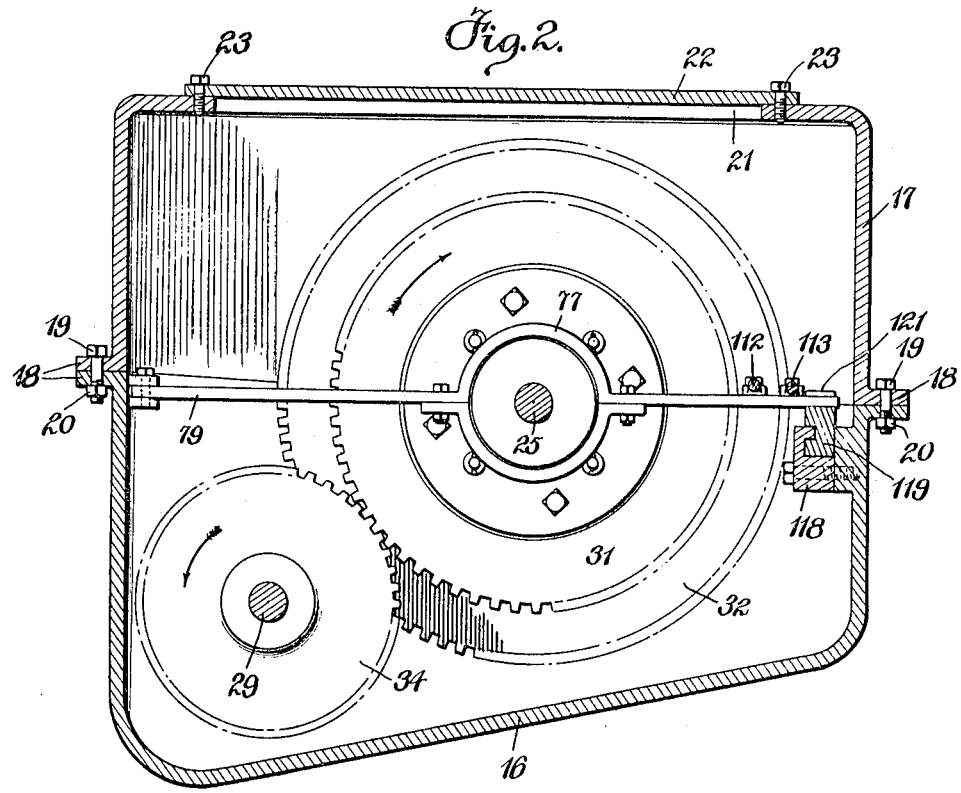
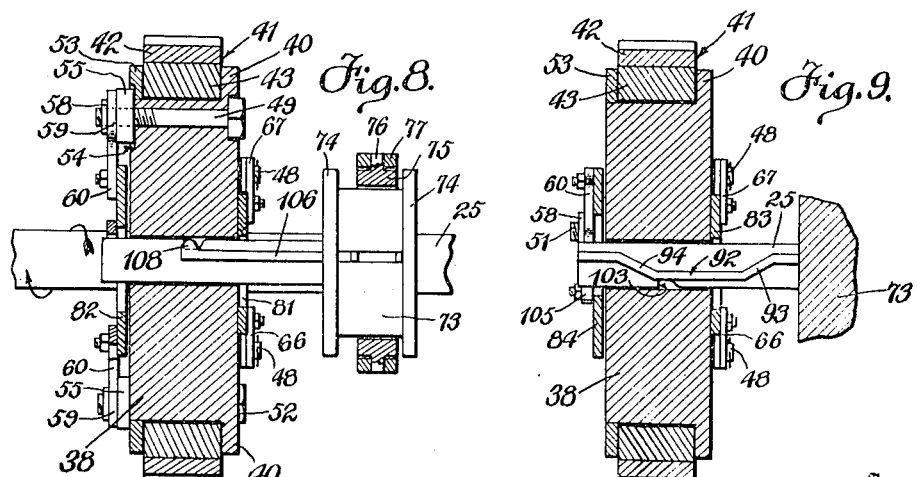
Inventor
B. C. Bailey,
By *[signature]*, Attorneys B. C. BAILEY.
AUTOMOBILE TRANSMISSION MECHANISM.
APPLICATION FILED MAR. 24, 1917. RENEWED AUG. 5, 1918.
1,291,715.
Patented Jan. 21, 1919.
5 SHEETS—SHEET 3.
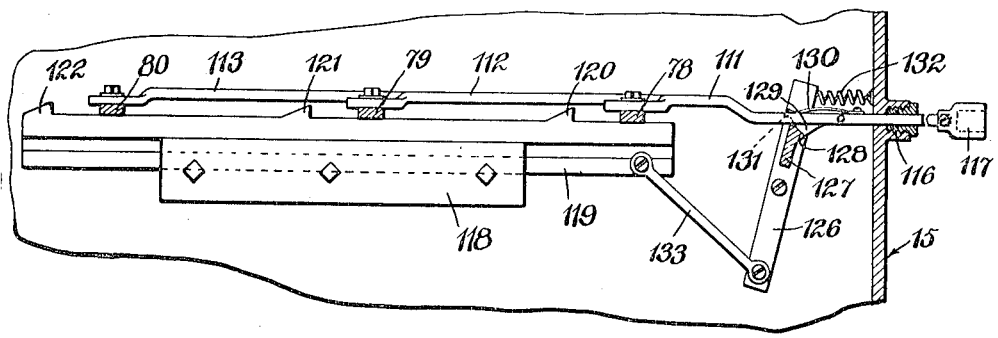
Fig. 3.
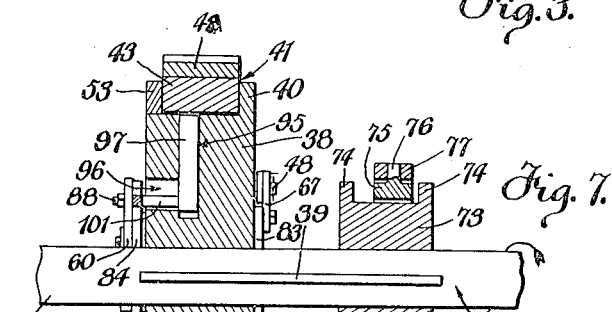
Fig. 7.
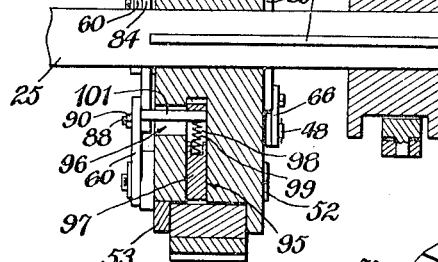
Fig. 10.
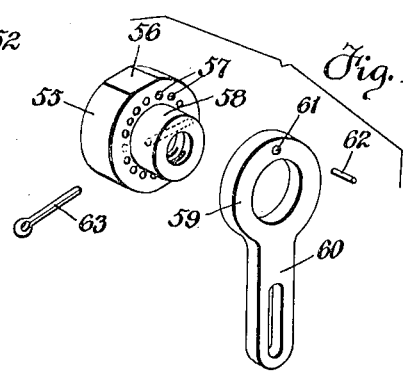
Fig. 13.
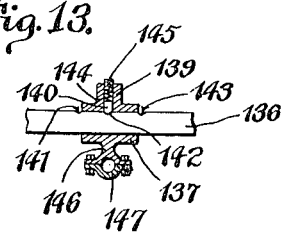
Inventor
B. C. Bailey,
By
Evans
Attorneys.

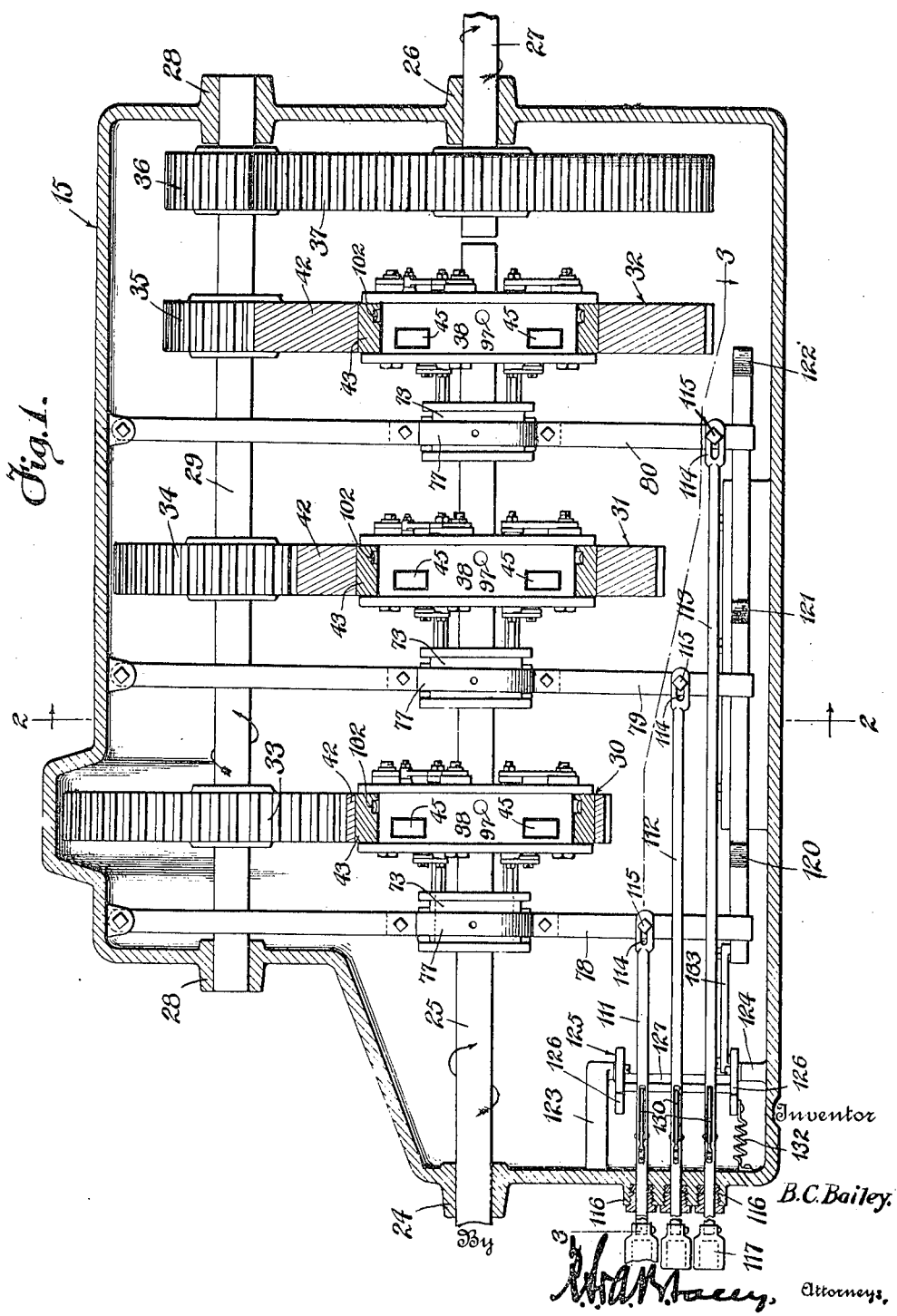

B. C. BAILEY.
AUTOMOBILE TRANSMISSION MECHANISM.
APPLICATION FILED MAR. 24, 1917. RENEWED AUG. 5, 1918.

1,291,715.

Patented Jan. 21, 1919.
5 SHEETS—SHEET 4.

Inventor
B.C. Bailey.

By
H.W.N.Bacey, Attorneys.

B. C. BAILEY.
AUTOMOBILE TRANSMISSION MECHANISM.
APPLICATION FILED MAR. 24, 1917. RENEWED AUG. 5, 1918.
1,291,715.
Patented Jan. 21, 1919.
5 SHEETS—SHEET 5
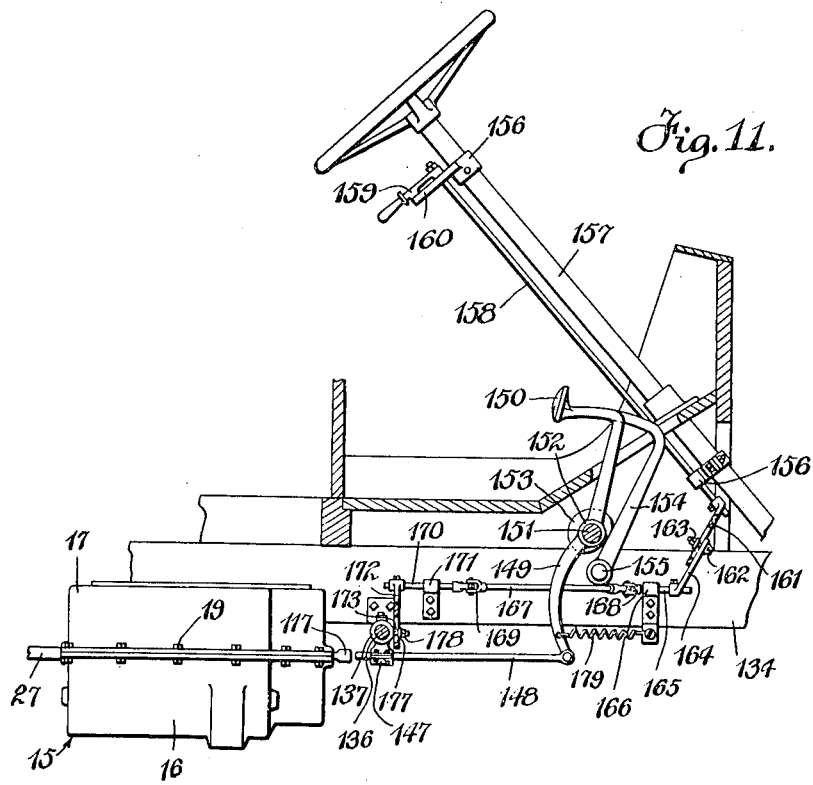
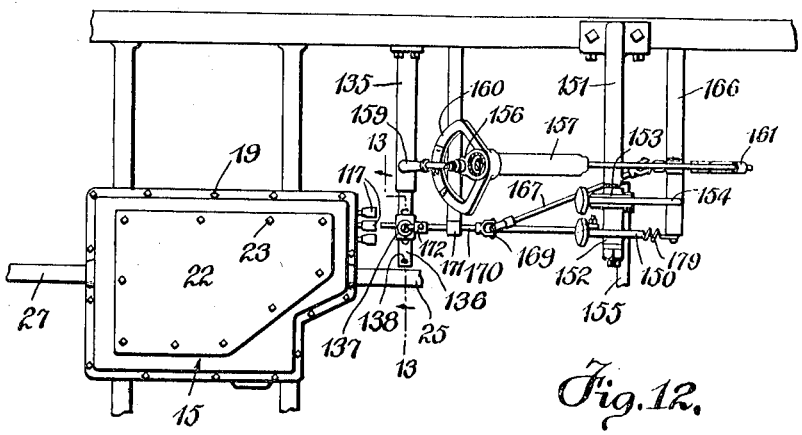
Inventor
B. C. Bailey.
By Hansocey, Attorneys.

UNITED STATES PATENT OFFICE.

BERT C. BAILEY, OF WELLSBORO, PENNSYLVANIA.

AUTOMOBILE TRANSMISSION MECHANISM.

1,291,715.  Specification of Letters Patent.  Patented Jan. 21, 1919.

Application filed March 24, 1917, Serial No. 157,238. Renewed August 5, 1918. Serial No. 248,462.

*To all whom it may concern:*

Be it known that I, BERT C. BAILEY, a citizen of the United States, residing at Wellsboro, in the county of Tioga and State of Pennsylvania, have invented certain new and useful Improvements in Automobile Transmission Mechanisms, of which the following is a specification.

My invention relates to new and useful improvements in transmission gearings, the primary object of my invention being the provision of an improved form of transmission gearing in which all of the gears are constantly in mesh, under all circumstances, so that all clashing of gears and injury thereto, such as is commonly experienced with sliding gear transmissions, is avoided.

In this connection, one of the objects which I have in view is the provision of a transmission gearing in which the drive shaft carries a plurality of compound clutch gears which form the drive elements of the transmission mechanism and which each include a hub portion, a gear ring loosely mounted about the hub portion, and means for locking the gear ring to the hub portion, each gear ring meshing with a gear fixed to a jack shaft, which in turn drives the driven shaft of the transmission.

Another object which I accomplish by this invention is the arrangement of centering shoes carried by the gear hubs and engageable with the gear rings when the hubs and rings are locked to properly center the hubs with respect to the rings and hold the parts rigid.

Another object of my invention resides in the provision of frictional clamping means between the hubs and rings for locking them together and in the provision of locking pins capable of being projected from the hubs to seat in recesses formed in the rings to afford positive locks in case of slipping.

In addition to the above described features, a still further object of my invention resides in the provision of a novel form of mechanism for locking the gear rings to the hubs of such a type as will permit the selective locking of any ring to its hub.

Another object which I have in view in the construction of this control mechanism is to so arrange it that the clutch controlling passage of power to the transmission mechanism will be thrown out before any change may be made in the setting of the transmission mechanism and will be held out until such change has been completed, this arrangement being of a character which in no way interferes with the normal and ordinary employment of the clutch.

Another object which I have in view is the provision of means for insuring the release of whatever gear ring is fixed to its hub before another gear ring can be locked to its hub.

With these and other objects in view, my invention will be more fully described, illustrated in the accompanying drawings, and then specifically pointed out in the claims which are attached to and form a part of this application.

In the drawings:

Figure 1 is a horizontal sectional view taken through my improved transmission gearing, the compound clutch gears being shown partially in section;

Fig. 2 is a vertical transverse sectional view taken on the line 2—2 of Fig. 1, looking in the direction of the arrows;

Fig. 3 is a fragmentary sectional view taken on the line 3—3 of Fig. 1;

Fig. 7 is a sectional view taken on the line 7—7 of Fig. 6;

Fig. 8 is a sectional view taken on the line 8—8 of Fig. 5, looking in the direction of the arrows;

Fig. 9 is a corresponding view taken on the line 9—9 of Fig. 5, also looking in the direction of the arrows;

Fig. 10 is an unassembled perspective view of the clamping mechanism for locking the gear rings to their hubs;

Fig. 11 is a fragmentary sectional view of a motor vehicle, showing my transmission and its control mechanism;

Fig. 12 is a plan view of the structure shown in Fig. 11;

Fig. 13 is a detail sectional view taken on the line 13—13 of Fig. 12.

Corresponding and like parts are referred to in the following description and indicated in all the views of the drawings by the same reference characters.

Figure 4:
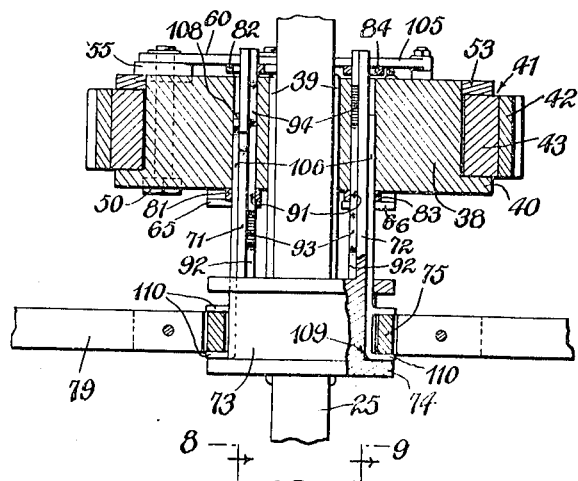
Fig. 4 is a horizontal sectional view taken through one of the clutch gears and illustrating the application of the locking mechanism therefor.

My improved transmission proper includes a casing 15 comprising a lower portion 16 and upper portion 17, preferably having mating flanges 18 to receive bolts 19 having nuts 20 by means of which the casing sections are secured together. Preferably, the upper casing section 17 is formed with an opening 21 in order that the inclosed mechanisms may be readily accessible, a removable cover 22 secured by bolts 23 being provided to normally close this opening. The mating edges of the forward ends of the casing sections are formed to provide a bearing 24 for a drive shaft 25 which leads from the usual clutch, not shown, and the rear ends of the casing sections are formed to provide a bearing 26 in alinement with the bearing 24 to journal the forward end of the driven shaft 27 which alines with the shaft 25. The mating edges, at both ends of the casing, are further formed to provide alined bearings 28 to journal a jack shaft 29 which extends parallel and in spaced relation to the shafts 25 and 27. Mounted upon the drive shaft 25 in spaced relation are the compound clutch gears, indicated as a whole by the numerals 30, 31 and 32 and fixed upon the jack shaft are the gears 33, 34 and 35 which mesh, respectively, with the clutch gears 30, 31 and 32. Also fixed upon the jack shaft is a pinion 36 which meshes with a gear 37 fixed upon the driven shaft 27 so that any power transmitted to the jack shaft from the drive shaft through one of the clutch gears will be transmitted to the driven shaft. The gears of the various shafts are, of course, of varying sizes so that by selectively locking the clutch gears to their shaft power may be transmitted to the driven shaft at any one of a number of predetermined speeds. In Fig. 1 I have illustrated three speeds, the gears 30 and 33 constituting the low speed, the gears 31 and 34, the intermediate speed and the gears 32 and 35, the high speed gears of the transmission mechanism.

One of the main features of my present invention is the construction of the compound clutch gears 30, 31 and 32 and their controlling mechanisms and as these gears are identical, save in size, a description of one will suffice for all. I have illustrated the clutch gear 30 in Figs. 4 to 9 of the drawings as a sample of the clutch gear construction. As there shown, the clutch gear includes a disk-shaped hub 38 which is fixed upon the shaft by a key 39 or other suitable means and which, at its forward face, is provided with an annular outstanding flange 40. Fitting snugly about the peripheral face of this hub is a gear ring 41 which is normally free to turn about the hub and which includes the body proper 42 and a lining 43 of steel to give the requisite strength. For the sake of economy in manufacture, all of the hubs and linings are of uniform size for all clutch gears and the difference in size of the various gears is accomplished by changes in size of the gear rings proper 42 employed. This feature is clearly shown in Fig. 1. The hub 38 is provided with a plurality of recesses or pockets 44 peripherally spaced from each other and opening through the peripheral face of the hub and seated in each of these pockets is a centering shoe 45, the outer face of which is shaped to conform to the curvature of the inner face of the lining 43. Each of these recesses at its inner portion is formed with an extension 46 to seat an actuating cam 47 which is fixed upon the squared portion of a shaft 48, the end of which projects through the forward face of the hub.

A pair of bolts 49 and 50 are passed through the hub with their heads engaging against the front face of the hub and their threaded shanks projecting somewhat beyond the rear face, these bolts being disposed adjacent the periphery of the hub and at any convenient point and preferably at 90° from each other in the manner shown. A second pair of bolts 51 and 52 are also passed through the hub in a similar manner so that the four bolts are substantially equally spaced from each other. The bolts 50 and 51 have their shanks provided with high speed threads so arranged that a nut turned in the usual manner upon them will be moved rapidly toward the heads of the bolts, while the bolts 49 and 52 have their shanks formed with high speed threads in such a manner that nuts turned in the opposite direction will move toward the heads of the bolts. A clutch or clamping ring 53 is mounted about the periphery of the hub and engages against that side of the gear ring opposite the flange 40 of the hub and the rear face of the hub and outer face of the gear ring adjacent each bolt are formed with recesses providing circular seats 54. Nuts 55 are provided for the bolts, one pair being threaded in the usual manner and the other with reverse threads, the body of each nut being preferably formed with certain angular faces 56 to permit its application and each being formed in its outer face with a plurality of circumferentially disposed closely spaced sockets 57. Within the line of these sockets, the nut is formed with an annular shoulder 58 to receive the eye 59 of a lever 60, this eye being formed with a perforation 61 through which a pin 62 may be passed to seat in any one of the sockets 57 to adjustably secure the lever to the nut. A cotter pin 63 may be passed through the shoulder outside of the eye 59, in the manner shown in Fig. 10, to hold the lever against displacement and at the same time to in no way interfere with the turning of the nut through swinging of the lever. Obviously, if the clamping nuts are turned in the proper directions, the clamping ring will be forced into engagement with the gear ring to force it in turn in engagement with the flange 40 and so frictionally lock the gear ring to the hub, while if the nuts are turned in the reverse directions, the clamping ring will be released.

The ends of the shafts 48 are reduced to provide resultant annular shoulders which are provided with sockets corresponding to the sockets 57 of the nuts 55 and levers 64, 65, 66 and 67 are provided having eyes 68 to receive the reduced terminals of the shafts and formed with perforations to receive pins 69 for adjustably locking the levers to the shafts at any desired angles to the cams 47, cotter pins 70 being provided to hold the levers against displacement. As this adjustable connection between the cam shafts and their levers is the same as the adjustable connection between the levers 60 and the nuts 55, any further explanation or any more detailed illustration than that contained in the drawings is believed to be unnecessary.

Figure 5:
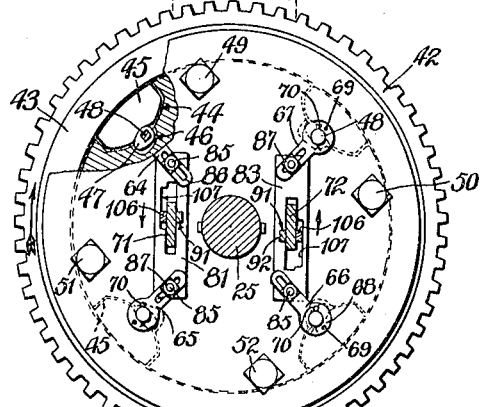
Fig. 5 is a front face view of one of the clutch gears, parts being broken away.
Figure 6:
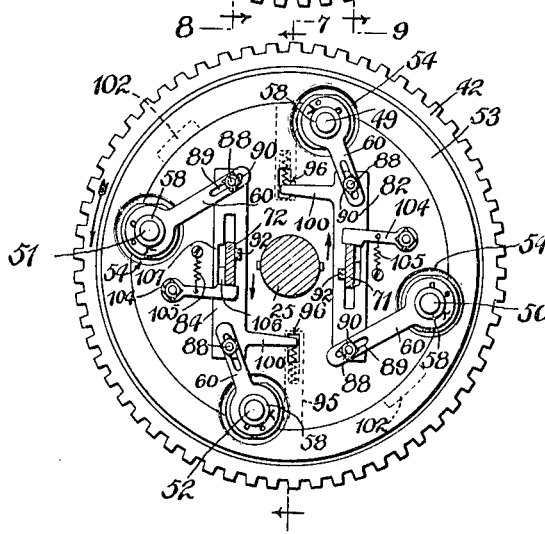
Fig. 6 is a rear face view of the clutch gear shown in Fig. 5.

A pair of sliding cam plates 71 and 72 are mounted to slide through slots formed in the hub parallel to the shaft and at diametrically opposite sides thereof, as clearly shown in Figs. 5 and 6 of the drawings, the slots being so formed as to snugly receive the opposite edges of the plates and yet provide spaces opposite the intermediate portions of the sides of the plates, as clearly shown in the drawings. These plates at their forward ends are joined to a collar 73 having sliding key connection with the shaft 25. These plates may be joined to the collar in any suitable manner or formed integrally therewith, as shown in Fig. 4. The collar is provided at its ends with annular flanges 74 between which loosely seats a shipper collar 75 provided at diametrically opposite points with trunnions 76 which pivotally engage in opposite sides of a yoke 77 of a shipper lever. The various shipper levers are indicated by the numerals 78, 79 and 80 and operate the collars 73 of the clutch gears 30, 31 and 32, respectively. At this point it should be noted that the shipper collars 75 are of considerably less width than the space between the flanges 74 so as to permit considerable swinging of the shipper levers prior to movement of the collars 73. A reason for this will be later given.

The cam plate 71 operates through a slotted slide 81 mounted against the forward face of the hub and through a slotted slide 82 mounted against the rear face of the hub, while the cam plate 72 operates through a slotted slide 83 mounted against the forward face of the hub and a slotted slide 84 mounted against the rear face thereof. Bolts 85, carried by the ends of the slide 81 and by the ends of the slide 83, pass through longitudinal slots 86 formed in the lever arms 64, 65, 66 and 67 and are provided with nuts 87 which hold the lever arms and slides in operative relation. In like manner, bolts 88 carried by the ends of the slides 82 and 84 project through longitudinal slots 89 in the ends of the levers 60 and are provided with nuts 90 which hold the parts together.

The slots in all of these slides are of somewhat greater length than the width of the cam plates and at their inner sides each slot is provided with an extension 91. Secured to the inner face of each cam plate is a double ended cam strip 92 which is movable through these extensions 91 of the slots of the slides, each cam strip having a cam portion 93 coöperating with one of the slides at the forward face of the hub and a second cam portion 94 spaced from the first and adapted to simultaneously engage in the extensions of the slots of one of the slides against the rear face of the hub. These cam strips are so formed and disposed upon the cam plates that upon movement of the collar 73 toward the hub the cam plate 71 will force the slide 81 downwardly and the slide 82 upwardly, looking at them from the direction shown in Figs. 5 and 6 of the drawings. In like manner, the cam plate 72 will at the same time force the slide 83 upwardly and the slide 84 downwardly. The lever arms 64, 65, 66 and 67 are so set upon the shafts 48 that the above described movement of the slides 81 and 83 will cause turning of all of the cams 47 to force the shoes 45 into engagement with the gear ring lining 43, while reverse movement of the cam plates will swing the cams out of engagement with the shoes to permit their return movement. Obviously, by properly adjusting the various levers upon their cam shafts, the parts may be so arranged that the full throw of the slides by the cam plates will just bring the shoes 45 into rigid clamping engagement with the lining 43. Furthermore, as the shoes or the cams become worn, the levers may be readjusted upon the cam shafts to take up the space lost through wear.

This same movement of the collar 73 toward the gear will act through the cam plate 71 to move the slide 82 upwardly and through the cam plate 72 to move the slide 84 downwardly. The bolts 49 and 50 are so threaded that this upward movement of the slide 82 will act through the levers 60 to turn the nuts 55 toward the heads of the bolts, while the bolts 51 and 52 are so threaded that the downward movement of the slide 84 will cause corresponding movement of the nuts upon such bolts toward the heads of the bolts. As a result, at the same time that the shoes 45 are brought in engagement with the gear ring lining 43, the nuts 55 are turned home against the clamping ring 53 to force it into clamping engagement with the gear ring and so additionally and strongly lock the gear ring and hub together for simultaneous turning movement.

Although the engagement between the shoes 45 and gear ring is intended primarily merely as a centering means for the gear ring with respect to the hub, there is, of course, a certain frictional locking between the shoes and ring and this, in addition to the strong clamping action between the hub and clamping rings, is ordinarily sufficient to secure the hub and gear ring against independent turning movement under ordinary strains to which they will be subjected in transmitting power from the drive shaft 25 to the jack shaft 29. However, I prefer to provide a positive locking means between the hub and gear ring which will come into play in case of any slippage between the two. For this reason, the hub is formed at diametrically opposite points with radial sockets 95 parallel with the line of movement of the slides 82 and 84. These sockets open through the peripheral face of the hub and slots 96 formed in the rear face of the hub communicate with the inner ends of the sockets. Mounted in each socket is a locking pin 97 formed at its inner end with a longitudinal slot 98 in which is seated a helical spring 99. The slides 82 and 84 are provided with laterally or inwardly directed arms 100 having fingers 101 which project through the slots 96 and into the slots 98 of the locking pins and engage between the inner end portions of the latter slots and the inner ends of the springs 99. These arms and fingers are so arranged that in inactive position of the slides they hold the pins with their outer ends substantially flush with the peripheral face of the hub, while in active position of the slides they compress the springs 99 and, consequently, exert a constant outward pressure against the pins. At diametrically opposite points, the inner face of the lining ring 43 is formed with seats 102 into which the ends of the pins may be projected if the hub and gear ring move relative to each other, while the slides are in active position. Obviously, movement of the slides to inactive position will retract the locking pins and thus free the gear ring from the hub.

To insure against movement of the cam plates and, consequently, the slides from their active position while the hub and gear ring are locked together, I provide each cam plate with a notch 103 in one edge which, when the cam plate is in active position, will be located just outside of the coöperating slide at the rear of the hub. Latch levers 104 are pivoted to the rear face of the hub and springs 105 constantly urge these latch levers into engagement with the edges of the cam plates so that when the cam plates reach active position the free ends of the levers snap into the notches 103 to hold the cam plates against reverse movement. Latch releasing rods 106 engage against the outer faces of the cam plates and are free to move in lateral extensions 107 of the slots in the slides, these extensions being so formed as to in no way move the latch releasing rods 106 during movement of the slides. These rods at their rear ends are formed with cam heads 108 which, in active position of the cam plates, will be located immediately at the rear of the latch levers and which, upon forward movement of the rods, will act to raise the latch levers out of engagement with the notches of the cam plates. The forward ends of these rods 106 project through the rear flange 74 of the collar 73 and operate in grooves 109 formed in the outer face of the collar. These forward ends of the rods have spaced lateral fingers 110 projecting beyond the groove, one at either side of the shipper collar 75 so that any movement of the shipper collar will cause movement of the rods. The amount of play between the shipper collar and the flanges of the collar 73 is such that upon swinging of a shipper lever to move its collar away from the clutch gear the movement of the shipper collar, before it picks up the collar 73, will be sufficient to move the rods 106 to release the latches.

As a means for swinging the shipper levers to selectively lock and unlock the various gear rings and their hubs, I provide shipper lever actuating rods 111, 112 and 113 coöperating with the shipper levers 78, 79 and 80, respectively. Each of these rods at its rear end has a slot 114 to receive a pin or bolt 115 carried by its shipper lever adjacent its free end and allowing a certain amount of play between the actuating rod and lever, for a purpose which will be later explained. The opposite ends of the shipper rods project through the forward wall of the casing, stuffing boxes 116 being located in such wall for their passage, and carry socketed heads 117. These rods are horizontally disposed in parallel spaced relation so that their heads are in juxtaposition to each other, intermediate portions of certain of the rods being bent to pass above or below certain of the shipper levers as may be necessary to maintain such rods as a whole in horizontal position without any interference with their action or the action of the remaining shipper levers. A guide bracket 118, secured to the inner face of the casing, has tongue and groove engagement with a reciprocally mounted carriage 119 upon the upper face of which the shipper rods rest and this carriage at spaced intervals is provided with upwardly projecting teeth or shoulders 120, 121 and 122 which, in normal position of the carriage, are so located that in active position of the carriage each will lie immediately at the rear of its respective shipper lever if such lever is in active or rearmost position. As a result, it will be clear that forward movement of the carriage will swing any shipper lever in active position into inactive position. Furthermore, these teeth or shoulders are spaced a sufficient distance to permit subsequent return of the carriage without their coming into engagement with any of the shipper levers.

Brackets 123 and 124 pivotally support between them a carriage actuating trip device 125 which includes substantially vertically disposed spaced parallel side members 126, each pivoted intermediate its length to one of the brackets and a transverse trip bar 127 so disposed that as the trip swings back and forth the upper edge of the bar will just clear the lower faces of the actuating rods 111, 112 and 113 which extend above it. The forward face of this bar is provided with a cam portion 128 and each rod is slotted to pivotally receive a pawl 129 which, in normal or neutral position of the parts, project below the rod to engage the trip bar, as clearly shown in Fig. 3 of the drawings. Leaf springs 130 serve to normally hold the pawls in depressed position and their downward swinging movement is limited by extension fingers 131 engaging in extensions or seats formed in the slots of the rods. A spring 132 serves to normally hold the trip 125 in the position shown in Fig. 3 and to automatically return it to such position when moved to another position, as will be later explained. A link 133 connects the lower end of one of the side members of the trip with the forward end portion of the carriage 119 so that rearward swinging of the upper portion of the strip will cause a forward movement of the carriage and a forward swinging of any shipper lever which may be in active position.

One means of selectively reciprocating the various shipper actuating rods to control the above described transmission mechanism is clearly shown in Figs. 11 and 12 of the drawings. As there shown, one of the side frame members 134 carries a stub shaft 135 which extends transversely of the vehicle and which has a reduced terminal 136 disposed slightly in advance of the socketed heads of the rods. Slidably mounted upon the reduced terminal of this shaft is a sleeve 137, the movement of which, in one direction, is limited by engagement with the unreduced portion of the shaft and in the other by engagement with a cotter pin 138 or equivalent device. This sleeve is formed with an upward extension 139 which houses a pawl 140 adapted to seat in one or another of the notches 141, 142 and 143 of the reduced shaft terminal 136. A spring 144, held in engagement with the pawl by a set screw 145, serves to force the pawl into any notch with which it is brought into alinement. These notches are in alinement with the socketed heads of the rods 111, 112 and 113, respectively. The sleeve, furthermore, carries a depending half bearing 146 which, with a removable half bearing 147, provides a bearing for the reciprocally mounted plunger 148, which is loosely pivoted at its free end to the lower end of the shank 149 of a gear shift pedal 150 which is swingingly mounted upon a shaft 151 carried by the frame of the vehicle. As a matter of fact, this shank is formed with a sleeve 152 which is free for turning movement upon the shaft and which carries a cam 153 disposed to engage the shank 154 of a clutch pedal, this clutch pedal being pivoted upon a shaft 155. This cam is so proportioned that during the first movement of the controlling pedal 150, it will engage the shank of the clutch pedal to throw out the clutch and will thereafter hold the clutch in inactive position throughout the remainder of the movement of the pedal 150. At the same time this in no way interferes with the usual manipulation of the clutch pedal.

Spaced clamping brackets 156, connected to the steering column 157 of the vehicle, journal a control rod 158 which, at its upper end, carries a hand lever 159 movable over a sector 160 having inscriptions or notches indicating the position which the hand lever must occupy for the various positions of the sleeve 139, as will be later apparent. The lower end of this control rod carries a slotted lever arm 161 and a bolt 162 and nut 163 connect the free end portion of this arm with a lever arm 164 carried by a shaft 165 journaled in a bracket 166 carried by the frame of the vehicle. A shaft section 167 is connected to the shaft section 165 by a universal joint 168 and is in turn connected by a universal joint 169 with a shaft section 170 journaled in a bracket 171 carried by the frame. The free end portion of this latter shaft section carries a slotted lever arm 172 and the sleeve 137 carries a pin 173 which projects through the slot of the lever arm and is held against displacement by a nut 178. Obviously, with the above described mechanism, swinging of the hand lever 159 to the left will cause a movement of the sleeve 137 to the right and swinging of the hand lever to the right will cause movement of the sleeve to the left so that by means of the hand lever the plunger 148 carried by the sleeve may be brought into alinement with any one of the socketed heads of the shipper lever actuating rods.

In describing the operation of my invention, I will assume that the transmission mechanism is in neutral condition, as shown in Fig. 1 of the drawings, that the engine is running and that the clutch is in active position. Under these conditions, no power will be transmitted to the driven shaft 27 for the reason that none of the gear rings will be locked to their hubs so that all the gear rings may remain stationary while the hubs revolve within them. To start the vehicle, the hand lever 159 is turned to the left to bring the plunger 148 into alinement with the socketed head of the rod 111.

When so turned the plunger is locked against swinging movement by engagement of the pawl 140 in the seat or notch 143. With this preparation and with the engine running at the proper speed, the transmission controlling pedal 150 is pressed which will first act through the sleeve 152 and cam 153 to swing the clutch pedal and move the clutch to inactive position. Further movement of the pedal 150 will still hold the clutch in inactive position but will act through the engagement of the plunger 148 with the socketed head of the rod 111 to swing the latter rearwardly. This movement of the rod 111 will cause a swinging of the trip 125 past dead center against the action of its spring 132 to draw the carriage 119 forwardly until its teeth or projections are immediately at the rear of the various shipper levers. This partial movement of the rod 111 will have no effect upon the shipper lever 78 as at that time the pin or bolt of such shipper lever is moving freely in the slot of the rod. As soon as the trip has been swung far enough to bring the carriage back to the extreme limit of its forward movement, the cam 128 of the trip will be lowered sufficiently to permit the pawl 129 to ride over the trip bar 127 which will free the trip and permit it and its carriage to return to normal position under the action of the spring 132. Continued movement of the rod 111 will then swing the shipper lever 78 rearwardly to the full extent of its movement to lock the gear ring of the clutch gear to its hub. The pedal may then be released and returned to normal position by a suitable spring 179. Preferably, this lever should be released gently as it will control the letting in of the clutch unless the driver chooses to place his foot upon the clutch pedal and control the clutch in the usual manner.

After release of the pedal 150, the rod 111 and its shipper lever will still remain in rearward position. This movement of the shipper lever to rearward position forces the cam plates through the hub of the clutch gear 30 to act through the slides 81 and 83 to bring the centering shoes 45 in engagement with the gear ring and through the slides 82 and 84 to force the clamping ring into engagement with the gear ring, as previously described. When the cam plates 65 have reached the full extent of their rearward movement, the latches 104 engage them to lock them against further movement and the hub and gear ring are, as a consequence, frictionally locked together. In case of any slippage, the locking pins will be brought into alinement with the recesses 102 and the gear ring and hub will be positively locked. Under these conditions, power will be transmitted from the drive shaft 25 through the clutch gear 30 and gear 33 to the jack shaft and from the jack shaft by way of the pinion 36 and gear 37 to the driven shaft 27.

After the vehicle has attained sufficient speed, the hand lever may be swung to intermediate position to bring the plunger 148 in alinement with the head of the rod 112 and the control pedal 150 may be again pushed forward to its full extent and subsequently released. The operation of the parts will be substantially the same as that previously described, with the exception that upon the swinging of the trip to move the carriage forwardly, the tooth 120 of the carriage will engage the shipper rod 78 to swing it and the cam plate carrying collar to inactive position and to, consequently, return the plunger 111 to normal position. This movement of the plunger is permitted as the pawl will ride freely over the trip bar 127, due to the yielding of the spring 130. It should be noted at this point that the first movement of the shipper lever 78 toward inactive position operates the latch rods 106 to release the latches so that before any movement of the collar itself, the cam plates will be released. Of course, the rearward movement of the operating rod 112 will lock the clutch gear 31 in the manner previously described in connection with the clutch gear 30.

Obviously, the transmission mechanism may be changed from this second speed drive to high speed drive by moving the plunger into alinement with the rod 113 and swinging the pedal 150. This operation will, of course, cause a release of the clutch gear 31 and a locking of the clutch gear 32.

If the driver at any time wishes to place the transmission in neutral condition, he may do so by bringing the plunger into alinement with any one of the rods other than that controlling the gear at the present time locked and by then pushing the pedal 150 forwardly a sufficient distance to cause operation of the trip and then releasing the pedal without completing its movement to lock the gear controlled by the selected rod. Obviously, the above described transmission mechanism may be changed from any one of the speeds to any other speed desired and the mechanism is, therefore, selective in its action.

Attention should be paid to the fact that all of the gears are at all times in mesh so that there can be no clashing of gears during change from one speed drive to another, and to the further fact that when power is being transmitted, those gear rings running idly upon their hubs are turning in the same direction as the hubs only at slightly different speeds so that the friction between them is relatively slight. The gear rings should fit the hubs closely enough to just permit a sufficient film of oil to be maintained between them and the centering shoes should engage the gear rings with sufficient force to insure clamping the rings in properly centered relation with respect to their hubs when any ring is locked to its hub. The engagement of the gear rings between the flanges of the hubs and the clamping rings is such as to insure a strong frictional lock between the parts so that, as a rule, the positive lock will not be absolutely essential and in any event relatively little strain will be placed upon it. Because of the centering shoes, all chattering of the gears is prevented as any clutch gear transmitting power is to all intents and purposes rigid with the shaft carrying it. Obviously, many changes in the details of construction may be made without affecting the principles of operation and I therefore reserve the right to make any changes within the scope of the appended claims.

Having thus described the invention, what is claimed as new is:

1. In a transmission gearing, a drive shaft, a driven shaft, a jack shaft, power transmitting means between the jack shaft and driven shaft, a plurality of gears fixed to the jack shaft, a plurality of hubs fixed to the drive shaft, gear rings mounted for free rotation one about each hub and each meshing with one of the gears of the jack shaft, means for selectively clamping each gear ring to its hub, and means for automatically locking such clamping means.

2. In a transmission gearing, a shaft, a hub fixed to the shaft, a gear ring mounted to turn freely about the hub, cam operated means for centering the gear ring with respect to the hub, and cam operated means for locking the gear ring to turn with its hub.

3. In a transmission gearing, a shaft, a hub fixed to the shaft, a gear ring mounted to turn freely about the hub, and cam operated means for simultaneously centering the ring with respect to the hub and locking it to the hub.

4. In a transmission gearing, a shaft, a hub fixed to the shaft, an annular flange projecting from the peripheral face of the hub, a gear ring mounted to turn freely about the hub and engaging at one side against the flange, a clamping ring mounted about the hub and engaging the other side of the gear ring, and means for forcing the clamping ring into close engagement with the gear ring to wedge it against the flange.

5. In a transmission gearing, a shaft, a hub fixed to the shaft, an annular flange projecting from the peripheral face of the hub, a gear ring mounted to turn freely about the hub and engaging at one side against the flange, a clamping ring mounted about the hub and engaging the other side of the gear ring, and means for forcing the clamping ring into close engagement with the gear ring to wedge it against the flange, said means including bolts passed through the hub, and clamping nuts threaded upon the bolts to simultaneously engage the clamping ring.

6. In a transmission gearing, a shaft, a hub fixed to the shaft, an annular flange projecting from the peripheral face of the hub, a gear ring mounted to turn freely about the hub and engaging at one side against the flange, a clamping ring mounted about the hub and engaging the other side of the gear ring, and means for forcing the clamping ring into close engagement with the gear ring to wedge it against the flange, said means including bolts passed through the hub, clamping nuts threaded upon the bolts to simultaneously engage the clamping ring, an operating collar reciprocally mounted upon the shaft to turn therewith, cam elements carried by the collar and movable through the hub, and operative connection between the cam elements and nuts.

7. In a transmission gearing, a shaft, a hub fixed to the shaft, an annular flange projecting from the peripheral face of the hub, a gear ring mounted to turn freely about the hub and engaging at one side against the flange, a clamping ring mounted about the hub and engaging the other side of the gear ring, means for forcing the clamping ring into close engagement with the gear ring to wedge it against the flange, said means including bolts passed through the hub, clamping nuts threaded upon the bolts to simultaneously engage the clamping ring, an operating collar reciprocally mounted upon the shaft to turn therewith, cam elements carried by the collar and movable through the hub, slides mounted against the face of the hub and movable through movement of the cam elements, and lever arms carried by the nuts and operatively connected to the slides whereby reciprocation of the cam elements will reciprocate the slides and turn the nuts.

8. In a transmission gearing, a shaft, a hub fixed to the shaft, a gear ring free to rotate about the hub, the hub in its peripheral face being provided at spaced intervals with recesses, centering shoes seated in the recesses and adapted when projected to engage the inner face of the gear ring to center it with respect to the hub, and means for projecting the shoes.

9. In a transmission gearing, a shaft, a hub fixed to the shaft, a gear ring free to rotate about the hub, the hub in its peripheral face being provided at spaced intervals with recesses, centering shoes seated in the recesses and adapted when projected to engage the inner face of the gear ring to center it with respect to the hub, cam shafts mounted in the hub, cams carried by the shafts and engaging the shoes whereby the shoes may be projected, and means for turning the cam shafts.

10. In a transmission gearing, a shaft, a hub fixed to the shaft, a gear ring free to rotate about the hub, the hub in its peripheral face being provided at spaced intervals with recesses, centering shoes seated in the recesses and adapted when projected to engage the inner face of the gear ring to center it with respect to the hub, cam shafts mounted in the hub, cams carried by the shafts and engaging the shoes whereby the shoes may be projected, and means for turning the cam shafts, said means including a collar reciprocally mounted on the shaft to turn therewith, cam elements carried by the collar and movable through the hub, and operative connection between the cam elements and cam shafts.

11. In a transmission gearing, a shaft, a hub fixed to the shaft and provided at either side of the shaft with parallel slots, a collar reciprocally mounted on the shaft but fixed to turn therewith, cam plates carried by the collar and movable through the slots of the hub, slides fitting about the cam plates and engaging against the front and rear faces of the hub whereby the slides will be reciprocated through reciprocation of the cam plates, the hub being formed at spaced intervals with recesses in its peripheral face and with an annular flange projecting from its periphery at one side, a gear ring mounted for free turning movement about the hub, a clamping ring mounted about the hub and engaging against that side of the gear ring opposite the flange, centering shoes mounted in the recesses of the hub, operative connection between the centering shoes and certain of the slides whereby movement of the cam plates in one direction will project the shoes into engagement with the gear ring, clamping nuts engageable with the clamping ring to bind the gear ring between it and the flange, and operative connection between the remainder of the slides and the clamping nuts whereby the same movement of the cam plates will force the clamping nuts into engagement with the clamping ring.

12. In a transmission gearing, a shaft, a hub fixed to the shaft and provided at either side of the shaft with parallel slots, a collar reciprocally mounted on the shaft but fixed to turn therewith, cam plates carried by the collar and movable through the slots of the hub, slides fitting about the cam plates and engaging against the front and rear faces of the hub whereby the slides will be reciprocated through reciprocation of the cam plates, the hub being formed at spaced intervals with recesses in its peripheral face and with an annular flange projecting from its periphery at one side, a clamping ring mounted about the hub and engaging against that side of the gear ring opposite the flange, centering shoes mounted in the recesses of the hub, operative connection between the centering shoes and certain of the slides whereby movement of the cam plates in one direction will project the shoes into engagement with the gear ring, clamping nuts engageable with the clamping ring to bind the gear ring between it and the flange, operative connection between the remainder of the slides and the clamping nuts whereby the same movement of the cam plates will force the clamping nuts into engagement with the clamping ring, and means for automatically locking the cam plates in such position.

13. In a transmission gearing, a shaft, a hub fixed to the shaft and provided at either side of the shaft with parallel slots, a collar reciprocally mounted on the shaft but fixed to turn therewith, cam plates carried by the collar and movable through the slots of the hub, slides fitting about the cam plates and engaging against the front and rear faces of the hub whereby the slides will be reciprocated through reciprocation of the cam plates, the hub being formed at spaced intervals with recesses in its peripheral face and with an annular flange projecting from its periphery at one side, a clamping ring mounted about the hub and engaging against that side of the gear ring opposite the flange, centering shoes mounted in the recesses of the hub, operative connection between the centering shoes and certain of the slides whereby movement of the cam plates in one direction will project the shoes into engagement with the gear ring, clamping nuts engageable with the clamping ring to bind the gear ring between it and th flange, operative connection between the remainder of the slides and the clamping nuts whereby the same movement of the cam plates will force the clamping nuts into engagement with the clamping ring, means for automatically locking the cam plates in such position, means for moving the collar to bring the cam plates into and out of such position, and means actuated by the collar moving means for releasing the locks of the cam plates.

14. In a transmission gearing, a shaft, a hub fixed to the shaft and provided at either side of the shaft with parallel slots, a collar reciprocally mounted on the shaft but fixed to turn therewith, cam plates carried by the collar and movable through the slots of the hub, slides fitting about the cam plates and engaging against the front and rear faces of the hub whereby the slides will be reciprocated through reciprocation of the cam plates, the hub being formed at spaced intervals with recesses in its peripheral face and with an annular flange projecting from its periphery at one side, a clamping ring mounted about the hub and engaging against that side of the gear ring opposite the flange, centering shoes mounted in the recesses of the hub, operative connection between the centering shoes and certain of the slides whereby movement of the cam plates in one direction will project the shoes into engagement with the gear ring, clamping nuts engageable with the clamping ring to bind the gear ring between it and the flange, operative connection between the remainder of the slides and the clamping nuts whereby the same movement of the cam plates will force the clamping nuts into engagement with the clamping ring, means for automatically locking the cam plates in such position, means for moving the collar to bring the cam plates into and out of such position, means actuated by the collar moving means for releasing the locks of the cam plates, and locking pins mounted in the hub and controlled by certain of the slides whereby when the cam plates are moved to position to project the shoes the pins will be projected into recesses in the inner face of the gear ring.

15. In a transmission gearing, a shaft, a hub fixed to the shaft, a gear ring mounted to rotate freely about the hub, means adapted in active position to center the gear ring with respect to the hub, means adapted in active position to clamp the gear ring to the hub, and means for simultaneously bringing both of said first mentioned means to active position.

16. In a transmission gearing, a shaft, a hub fixed to the shaft, a gear ring mounted to rotate freely about the hub, means adapted in active position to center the gear ring with respect to the hub, means adapted in active position to clamp the gear ring to the hub, means adapted when in active position for positively locking the gear ring to the hub, and means for simultaneously bringing all of the previously mentioned means to active position.

17. In a transmission gearing, a drive shaft, a driven shaft, a jack shaft, power transmitting means between the jack shaft and driven shaft, a plurality of gears fixed on the jack shaft, a plurality of hubs fixed on the drive shaft, gear rings mounted for free turning movement about the hubs and meshing with the gears of the jack shaft, collars reciprocally mounted upon the drive shaft and adapted to turn therewith, means operable upon the reciprocation of any collar toward the correlated hub for locking such hub to its gear ring, and means for selectively reciprocating the collars.

18. In a transmission gearing, a drive shaft, a driven shaft, a jack shaft, power transmitting means between the jack shaft and driven shaft, a plurality of gears fixed on the jack shaft, a plurality of hubs fixed on the drive shaft, gear rings mounted for free turning movement about the hubs and meshing with the gears of the jack shaft, collars reciprocally mounted upon the drive shaft and adapted to turn therewith, means operable upon the reciprocation of any collar toward the correlated hub for locking such hub to its gear ring, and means for selectively moving any collar toward its hub.

19. In a transmission gearing, a drive shaft, a driven shaft, a jack shaft, power transmitting means between the jack shaft and driven shaft, a plurality of gears fixed on the jack shaft, a plurality of hubs fixed on the drive shaft, gear rings mounted for free turning movement about the hubs and meshing with the gears of the jack shaft, collars reciprocally mounted upon the drive shaft and adapted to turn therewith, means operable upon the reciprocation of any collar toward the correlated hub for locking such hub to its gear ring, means for selectively moving any collar toward its hub, and means operated by said last mentioned means for automatically moving any other collar adjacent its hub away from its hub to free its hub and gear ring.

20. In a transmission gearing, a drive shaft, a driven shaft, a jack shaft, power transmitting means between the jack shaft and driven shaft, gears fixed to the jack shaft, hubs fixed to the drive shaft, gear rings mounted for free turning movement about the hubs and meshing with the gears of the jack shaft, collars reciprocally mounted on the drive shaft to turn therewith, means operable upon reciprocation of the collars in one direction into active position to lock the gear rings to the hubs and upon reciprocation of the collars in the other direction to inactive position to release the gear rings from the hubs, shipper levers coöperating with the collars, and actuating rods, one for each shipper lever.

21. In a transmission gearing, a drive shaft, a driven shaft, a jack shaft, power transmitting means between the jack shaft and driven shaft, gears fixed to the jack shaft, hubs fixed to the drive shaft, gear rings mounted for free turning movement about the hubs and meshing with the gears of the jack shaft, collars reciprocally mounted on the drive shaft to turn therewith, means operable upon reciprocation of the collars in one direction into active position to lock the gear rings to the hubs and upon reciprocation of the collars in the other direction to inactive position to release the gear rings from the hubs, shipper levers coöperating with the collars, and actuating rods, one for each shipper lever, said means being mounted for independent and selective reciprocation.

22. In a transmission gearing, a drive shaft, a driven shaft, a jack shaft, power transmitting means between the jack shaft and driven shaft, gears fixed to the jack shaft, hubs fixed to the drive shaft, gear rings mounted for free turning movement about the hubs and meshing with the gears of the jack shaft, collars reciprocally mounted on the drive shaft to turn therewith, means operable upon reciprocation of the collars in one direction into active position to lock the gear rings to the hubs and upon reciprocation of the collars in the other direction to inactive position to release the gear rings from the hubs, shipper levers coöperating with the collars, actuating rods, one for each shipper lever, said means being mounted for independent and selective reciprocation, and means whereby movement of any rod to move its correlated collar to active position will cause movement of any shipper lever, the collar of which is in active position, to inactive position.

23. In a transmission gearing, a drive shaft, a driven shaft, a jack shaft, power transmitting means between the jack shaft and driven shaft, gears fixed to the jack shaft, hubs fixed to the drive shaft, gear rings mounted for free turning movement about the hubs and meshing with the gears of the jack shaft, collars reciprocally mounted on the drive shaft to turn therewith, means operable upon reciprocation of the collars in one direction into active position to lock the gear rings to the hubs and upon reciprocation of the collars in the other direction to inactive position to release the gear rings from the hubs, shipper levers coöperating with the collars, actuating rods, one for each shipper lever, said means being mounted for independent and selective reciprocation, and means whereby movement of any rod to move its correlated collar to active position will cause movement of any shipper lever, the collar of which is in active position, to inactive position, said means including a carriage upon which the shipper levers seat, projections upon the carriage engageable with the shipper levers to move them to inactive position upon movement of the carriage in one direction, a swingingly mounted trip, connection between the trip and carriage, means normally holding the trip in one position to hold the carriage in a certain position, and means carried by each rod engageable with the trip to swing it to another position.

24. In a transmission gearing, a drive shaft, a driven shaft, a jack shaft, power transmitting means between the jack shaft and driven shaft, gears fixed to the jack shaft, hubs fixed to the drive shaft, gear rings mounted for free turning movement about the hubs and meshing with the gears of the jack shaft, collars reciprocally mounted on the drive shaft to turn therewith, means operable upon reciprocation of the collars in one direction into active position to lock the gear rings to the hubs and upon reciprocation of the collars in the other direction to inactive position to release the gear rings from the hubs, shipper levers coöperating with the collars, actuating rods, one for each shipper lever, said means being mounted for independent and selective reciprocation, and means whereby movement of any rod to move its correlated collar to active position will cause movement of any shipper lever, the collar of which is in active position, to inactive position, said means including a carriage upon which the shipper levers seat, projections upon the carriage engageable with the shipper levers to move them to inactive position upon movement of the carriage in one direction, a swingingly mounted trip, connection between the trip and carriage, means normally holding the trip in one position to hold the carriage in a certain position, and means carried by each rod engageable with the trip to swing it to another position, said means being releasable from the trip after a partial movement of its rod toward active position and being such as to permit movement of its rod to inactive position, irrespective of the trip.

25. In a transmission gearing, a drive shaft, a jack shaft, gears fixed to the jack shaft, gear elements loose upon the drive shaft and meshing with those of the jack shaft, means including a plurality of reciprocally mounted elements for selectively locking the gear elements to the drive shaft, and means for selectively reciprocating the rods, said means including a reciprocally mounted plunger, a foot pedal for reciprocating the plunger, a support for the plunger, and means for swinging the support to bring the plunger in alinement with any one of the rods.

26. In a transmission gearing, a drive shaft a jack shaft, gears fixed to the jack shaft, gear elements loose upon the drive shaft and meshing with those of the jack shaft, means including a plurality of reciprocally mounted elements for selectively locking the gear elements to the drive shaft, and means for selectively reciprocating the rods, said means including a reciprocally mounted plunger, a foot pedal for reciprocating the plunger, a support for the plunger mounted for reciprocation at right angles to the rods, a hand lever, and operative connection between the hand lever and support whereby the support may be moved to bring the plunger into alinement with any desired rod.

27. In a transmission gearing, a drive shaft, a jack shaft, a plurality of gears fixed to the jack shaft, a plurality of gear elements loose on the drive shaft and meshing with the gears of the jack shaft, a plurality of reciprocally mounted rods, co-acting means between each rod and one of the gear elements whereby reciprocation of the rod in one direction will cause locking of its gear element to the drive shaft, a reciprocally mounted plunger, means for selectively swinging the plunger to bring it into alinement with any one of the rods, a pedal adapted when swung in one position to cut off transmission of power to the drive shaft, a pedal for reciprocating the plunger, and means controlled by the last mentioned pedal adapted upon turning of such pedal to reciprocate the plunger into engagement with one of the rods for moving the first pedal to position to cut off such transmission of power.

28. In a transmission gearing, a plurality of gear controlling reciprocating elements, a clutch pedal, a plunger capable of reciprocating any of the elements, means for bringing the plunger into position to operate any selected element, a foot pedal for actuating the plunger, and means coöperating between the foot pedal and clutch pedal whereby movement of the foot pedal will move the clutch pedal to inactive position.

29. In a transmission gearing, a plurality of gear controlling reciprocating elements, a clutch pedal, a plunger capable of reciprocating any of the elements, means for bringing the plunger into position to operate any selected element, a foot pedal for actuating the plunger, and means coöperating between the foot pedal and clutch pedal whereby movement of the foot pedal will move the clutch pedal to inactive position, said means being such as to in no way interfere with the normal use of the clutch pedal.

In testimony whereof I affix my signature.

BERT C. BAILEY.